United States Patent [19]

Pelrine

[11] Patent Number: 5,087,782
[45] Date of Patent: Feb. 11, 1992

[54] DEHYDROCYCLIZATION OF POLYALPHA-OLEFIN LUBRICANTS

[75] Inventor: Bruce P. Pelrine, Trenton, N.J.

[73] Assignee: Mobil Oil Corporation, Fairfax, Va.

[21] Appl. No.: 344,935

[22] Filed: Apr. 28, 1989

[51] Int. Cl.$^5$ .............................................. C07C 5/367
[52] U.S. Cl. ..................................... 585/417; 585/407; 585/322
[58] Field of Search ........................ 585/417, 407, 322

[56] References Cited

U.S. PATENT DOCUMENTS

| | | | |
|---|---|---|---|
| 4,105,707 | 8/1978 | Little et al. | 585/322 |
| 4,169,865 | 10/1979 | Bemforth et al. | 585/322 |
| 4,211,665 | 7/1980 | Pellegrini | 252/63 |
| 4,238,343 | 12/1980 | Pellegrini | 585/24 |
| 4,604,491 | 8/1986 | Dressler et al. | 585/26 |
| 4,714,794 | 12/1987 | Yoshida et al. | 585/26 |
| 4,720,602 | 1/1988 | Chu | 585/417 |
| 4,740,647 | 4/1988 | Hussmann et al. | 585/417 |
| 4,827,064 | 5/1989 | Wu | 585/10 |
| 4,827,073 | 5/1989 | Wu | 585/530 |

Primary Examiner—Asok Pal
Attorney, Agent, or Firm—Alexander J. McKillop; Charles J. Speciale; Malcolm D. Keen

[57] ABSTRACT

The disclosure reveals that aromatic structures can be introduced into the molecular structure of polyalpha-olefin lubricant oligomers by subjecting the polyalpha-olefin to a dehydrocyclization reaction which converts a portion of the pendant or branching alkyl groups in the recurring polymeric unit of PAO to aromatic structures. When the starting material for dehydrocyclization is PAO prepared by oligomerization of $C_6-C_{20}$ alpha-olefins in contact with reduced chromium oxide catalyst on porous support the dehydrocyclization reaction produces a lubricant oligomer with increased aromaticity without significantly degrading the viscometric properties of the feedstock lubricant, particularly the high VI of the starting material. The aromatic structures introduced lend increased thermal stability, wear resistance and solubilizing characteristics to the liquid lubricant oligomers so modified. The polyalpha-olefins produced by the dehydrocyclization process comprise novel compositions of matter containing up to five weight percent of aromatic structure attached as pendant groups to the backbone of the polyalpha-olefin structure.

24 Claims, No Drawings

DEHYDROCYCLIZATION OF POLYALPHA-OLEFIN LUBRICANTS

This invention relates to novel compositions of polyalpha-olefin (PAO) oligomers containing aromatic structures useful as lubricant basestock and lubricant additives and to their means of preparation. More particularly, the invention relates to novel lubricant compositions having high viscosity index (VI) and enhanced thermal stability prepared by dehydrocyclization of polyalpha-olefin oligomers that exhibit high VI and low pour point.

BACKGROUND OF THE INVENTION

Improvements over the performance of natural mineral oil based lubricants by the synthesis of oligomeric hydrocarbon fluids has been the subject of important research and development in the petroleum industry for many years and have led to the relatively recent market introduction of a number of superior polyalpha-olefin (PAO) synthetic lubricants, primarily based on the oligomerization of alpha-olefins or 1-alkenes. In terms of lubricant property improvement, the thrust of the industrial research effort on synthetic lubricants has been toward fluids exhibiting useful viscosities over a wide range of temperature i.e.,improved viscosity index, while also showing lubricity, thermal and oxidative stability and pour point equal to or better than mineral oil. These new synthetic lubricants lower friction and hence increase mechanical efficiency over a wider range of operating conditions than mineral oil lubricants.

Notwithstanding their generally superior properties, PAO lubricants are often formulated with additives, or an additive package, to enhance those properties for specific applications. The more commonly used additives include oxidation inhibitors, rust inhibitors, metal passivators, antiwear agents, extreme pressure additives, pour point depressants, detergent-dispersants, viscosity index (VI) improvers, foam inhibitors and the like. This aspect of the lubricant arts is specifically described in Kirk-Othmer "Encyclopedia of Chemical Technology", 3rd edition, Vol. 14, pp. 477-526, incorporated herein by reference.

Lube additive packages are complex and costly materials. Therefore, a significantly superior new lubricant is one in which the properties conferred on lube mixture by known additives are intrinsic to the structure of the new lubricant molecule, obviating or at least reducing the need for additives. Consequently, improvements in lubricant technology pursued by artisans in the field flow from both new additive development addressed to deficiencies in lubricant oligomers and new oligomer development for inherently better properties to displace additives. Increasing the aromaticity of lube mixtures is known to improve thermal stability and antiwear properties. However, in view of the paraffinic nature of PAO lubricants aromatic additives to PAO are often confronted with problems of solubility that limit their usefulness or require the use of costly dispersants.

Alkylated aromatics are known in the prior art as lubricant additives for their antiwear properties, thermal and oxidative stability as disclosed in U.S. Pat. Nos. 4,211,665, 4,238,343, 4,604,491 and 4,714,7944. Antiwear properties of alkylnaphthalene lubricating fluids are presented in Khimiya i Tekhnologiya Topliv i Masel, No. 8, pp. 28-29, August, 1986.

Recently, novel lubricant compositions (referred to herein as HVI-PAO) comprising polyalpha-olefins and methods for their preparation employing as catalyst reduced chromium on a silica support have been disclosed in U.S. patent applications serial number 210,434 and 210,435 filed June 23, 1988, incorporated herein by reference. The process comprises contacting $C_6$–$C_{20}$ 1-alkene feedstock with reduced valence state chromium oxide catalyst on porous silica support under oligomerizing conditions in an oligomerization zone whereby high viscosity, high VI liquid hydrocarbon lubricant is produced having branch ratios less than 0.19 and pour point below $-15°$ C. Lubricants produced by the process cover the full range of lubricant viscosities and exhibit a remarkably high VI and low pour point even at high viscosity. The molecular structure of HVI-PAO is novel, comprising the product of an essentially regular head to tail polymerization of alpha-olefin and providing an oligomer with large pendant alkyl groups on the recurring polymeric unit.

Dehydrocyclization is a well known reaction in the organic chemical arts for the conversion of linear and branched alkanes to aromatic compounds, as described in Royals "Advanced Organic Chemistry", Prentice-Hall, Inc., pp 145–147, incorporated herein by reference. The reaction is carried out typically by catalysis with dehydrogenation catalysts and proceeds through ring closure and dehydrogenation to provide an aromatic structure. The dehydrocyclization reaction can be characterized as a type of aromatization reaction and the terms are used interchangeably herein.

It is an object of the present invention to provide novel lubricant compositions having improved thermal stability or antiwear resistance and high viscosity index.

Yet another object of the present invention is to provide novel lubricant compositions comprising HVI-PAO incorporating aromatic branches in the oligomer structure.

A further object of the present invention is to provide novel HVI-PAO compositions having enhanced aromaticity and high VI.

Another object of the present invention is to provide a process for producing HVI-PAO containing increased aromaticity without significantly degrading viscosity or VI.

SUMMARY OF THE INVENTION

The discovery has been made that aromatic structures can be introduced into the molecular structure of polyalpha-olefin lubricant oligomers by subjecting the polyalpha-olefin to a dehydrocyclization reaction which converts a portion of the pendant or branching alkyl groups in the recurring polymeric unit of PAO to aromatic structures. When the starting material for dehydrocyclization is HVI-PAO it has been determined that carrying out the dehydrocyclization reaction produces a lubricant oligomer with increased aromaticity without significantly degrading the viscometric properties of the HVI-PAO, particularly the high VI of the starting material. As a result, PAO and HVI-PAO are produced containing aromatic structures that lend increased thermal stability, wear resistance and solubilizing characteristics to the liquid lubricant oligomers so modified. The improved solubilizing characteristics are particularly important for improving the solubility of aromatic additives in the modified lubricant oligomer.

The polyalpha-olefins produced by the dehydrocyclization process comprise novel compositions of matter containing up to five weight percent of aromatic structure attached as pendant groups to the backbone of the polyalpha-olefin structure.

For the more preferred HVI-PAO oligomers, the compositions have the recurring polymeric structure:

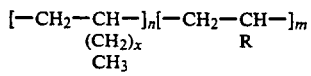

where x is 5 to 11, n is less than 500 and the ratio V of n to m is between 200 and 20; wherein R contains x+1 carbon atoms comprising aryl, aralkyl or alkylaryl.

More particularly, the instant invention discloses a process for the dehydrocyclization of $C_6$–$C_{20}$ polyalpha-olefin which comprises contacting the polyalpha-olefin with dehydrocyclization catalyst in a dehydrocyclization reaction zone under dehydrocyclclization conditions whereby modified polyalpha-olefin is produced containing aromatic structures.

The process is more specifically directed to the dehydrocyclization of HVI-PAO wherein the polyalpha-olefin comprises the product of the oligomerization of alpha-olefins containing 6 to 20 carbon atoms, or mixtures of such olefins. The oligomerization comprises contacting the olefins under oligomerization conditions, at reaction temperature of about 90° to 250° C. with a chromium catalyst on a porous support, which catalyst has been treated by oxidation at a temperature of 200° C. to 900° C. in the presence of an oxidizing gas and then by treatment with a reducing agent at a temperature and for a time sufficient to reduce the catalyst to a lower valence state. The oligomerization produces an oligomeric liquid lubricant composition comprising $C_{30}$–$C_{1300}$ hydrocarbons having a branch ratio of less than 0.19, weight average molecular weight between 420 and 45,000, number average molecular weight between 420 and 18,000, molecular weight distribution between 1 and 5 and pour point below $-15°$ C.

DETAILED DESCRIPTION OF THE INVENTION

The polyalpha-olefin oligomers used as starting material in the dehydrocyclization step of the process of the instant invention are conventional commercially available PAO or HVI-PAO prepared as subsequently described. The conventional PAO is typically prepared by Lewis acid or Ziegler catalyst initiated oligomerization of linear 1-alkenes and can be obtained from commercial sources. The more commonly available commercial PAO is prepared by oligomerization of 1-decene with aluminum chloride catalyst. The oligomer contains a preponderance of short chain alkyl branches of less than eight carbon atoms.

HVI-PAO oligomers used as starting material in the present invention are prepared by the oligomerization of $C_6$–$C_{20}$ alpha-olefins in contact with reduced valence state chromium oxide catalyst on porous support. It has been found that the process described herein to produce the HVI-PAO oligomers can be controlled to yield oligomers having weight average molecular weight between 420 and 60,000 and number average molecular weight between 420 and 24,000. Measured in carbon numbers, molecular weights range from $C_{24}$ to $C_{5000}$, with number-averaged molecular weight of $C_{30}$ to $C_{2100}$ and a preferred range of $C_{30}$ to $C_{1400}$. Molecular weight distributions, defined as the ratio of weight averaged molecular to number averaged molecular weight, range from 1.00 to 5, with a preferred range of 1.01 to 3.

1-hexene HVI-PAO oligomers of the present invention have been shown to have a very uniform linear $C_4$ branch and contain regular head-to-tail connections indicative of the following structure as confirmed by NMR:

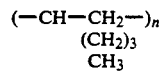

The oligomerization of 1-decene by reduced valence #state, supported chromium also yields a HVI-PAO with a structure analogous to that of 1-hexene oligomer. The lubricant products after distillation to remove light fractions and hydrogenation have characteristic C-13 NMR spectra confirming regular head-to-tail oligomerization of the alpha-olefin to produce a structure with mainly large alkyl group branches.

In general, the HVI-PAO oligomers have the following regular head-to-tail structure where n can be 3 to 17:

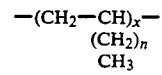

with some head-to-head connections.

Olefins suitable for use as starting material in the preparation of HVI-PAO include those olefins containing from 2 to about 20 carbon atoms such as ethylene, propylene, 1-butene, 1-pentene, 1-hexene, 1-octene, 1-de and 1-tetradecene and branched chain isomers such as 4-methyl-1-pentene. Also suitable for use are olefin-containing refinery feedstocks or effluents. However, the olefins used are preferably alpha-olefinic as for example 1-heptene to 1-hexadecene and more preferably 1-octene to 1-tetradene, or mixtures of such olefins.

HVI-PAO oligomers of alpha-olefins have a low branch ratio of less than 0.19 and superior lubricating properties compared to the alpha-olefin oligomers with a high branch ratio, as produced in all known commercial methods. HVI-PAO alpha-olefin oligomers are prepared by oligomerization reactions in which a major proportion of the double bonds of the alpha-olefins are not isomerized. These reactions include alpha-olefin oligomerization by supported metal oxide catalysts, such as Cr compounds on silica or other supported IUPAC Periodic Table Group VIB compounds. The catalyst most preferred is a lower valence Group VIB metal oxide on an inert support. Preferred supports include silica, alumina, titania, silica alumina, magnesia and the like.

The branch ratios used to characterize HVI-PAO are defined as the ratios of $CH_3$ groups to $CH_2$ groups in the lube oil calculated from the weight fractions of methyl groups obtained by infrared methods, as published in *Analytical Chemistry*, Vol. 25, No. 10, p. 1466 (1953).

$$\text{Branch ratio} = \frac{\text{wt fraction of methyl group}}{1 - (\text{wt fraction of methyl group})}$$

The supported metal oxide catalysts are preferably prepared by impregnating metal salts in water or organic solvents onto the support. Any suitable organic solvent known to the art may be used, for example, ethanol, methanol, or acetic acid. The solid catalyst precursor is then dried and calcined at 200° to 900° C. by air or other oxygen-containing gas. Thereafter the catalyst is reduced by any of several various and well known reducing agents such as, for example, CO, $H_2$, $NH_3$, $H_2S$, $CS_2$, $CH_3SCH_3$, $CH_3SSCH_3$, metal alkyl containing compounds such as $R_3Al$, $R_3B$, $R_2Mg$, RLi, $R_2Zn$, where R is alkyl, alkoxy, aryl and the like. Preferred are CO or $H_2$ or metal alkyl containing compounds.

Alternatively, the Group VIB metal may be applied to the substrate in reduced form, such as CrII compounds. The resultant catalyst is very active for oligomerizing olefins at a temperature range from below room temperature to about 500° C. at a pressure of 0.1 atmosphere to 5000 psi. Preferably the oligomerization is carried out at a temperature between 90° and 250° C. Contact time of both the olefin and the catalyst can vary from one second to 24 hours. Very low catalyst concentrations based on feed, from 10 wt% to 0.01 wt%, are used to produce oligomers. The catalyst can be used in a batch type reactor or in a fixed bed, continuous-flow reactor.

The following examples are presented to illustrate the preparation of the HVI-PAO catalyst and oligomerization process.

EXAMPLE 1

Catalyst Preparation and Activation Procedure 1.9 grams of chromium (II) acetate ($Cr_2(OCOCH_3)_4 2H_2O$) (5.58 mmole) (commercially obtained) is dissolved in 50 cc of hot acetic acid. Then 50 grams of a silica gel of 8-12 mesh size, a surface area of 300 $m^{2/}g$, and a pore volume of 1 cc/g, also is added. Most of the solution is absorbed by the silica gel. The final mixture is mixed for half an hour on a rotavap at room temperature and dried in an open-dish at room temperature. First, the dry solid (20 g) is purged with $N_2$ at 250° C. in a tube furnance. The furnace temperature is then raised to 400° C. for 2 hours. The temperature is then set at 600°. C. with dry air purging for 16 hours. At this time the 0 catalyst is cooled down under $N_2$ to a temperature of 300° C. Then a stream of pure CO (99.99% from Matheson) is introduced for one hour. Finally, the catalyst is cooled down to room temperature under $N_2$ and ready for use.

EXAMPLE 2

A commercial chrome/silica catalyst which contains 1% Cr on a large-pore volume synthetic silica gel is used. The catalyst is first calcined with air at 800° C. for 16 hours and reduced with CO at 300° C. for 1.5 hours. Then 3.5 g of the catalyst is packed into a tubular reactor and heated to 100° C. under the $N_2$ atmosphere. Purified 1-decene is pumped through the reactor at 250 to 320 psi. The product is collected periodically and stripped of light products having boiling points below 650° F. High quality HVI-PAO lubes with high VI are obtained as presented in the following table.

| Reaction Temp. °C. | WHSV g/g/hr | Lube Product Properties | | |
|---|---|---|---|---|
| | | V at 40° C. | V at 100° C. | VI |
| 120 | 2.5 | 1555.4 cs | 157.6 cs | 217 |
| 135 | 0.6 | 389.4 | 53.0 | 202 |
| 150 | 1.2 | 266.8 | 36.2 | 185 |
| 166 | 0.6 | 67.7 | 12.3 | 181 |

| Reaction Temp. °C. | WHSV g/g/hr | Lube Product Properties | | |
|---|---|---|---|---|
| | | V at 40° C. | V at 100° C. | VI |
| 197 | 0.5 | 21.6 | 5.1 | 172 |

In the process of the instant invention the HVI-PAO oligomer is converted to oligomer containing aromaticity in the structure of the oligomer molecule by treating the HVIPAO with dehydrocyclization. In the process a portion of the pendant alkyl groups of the oligomer are ring-closed and dehydrogenated to form aromatic ring structures. Depending upon the dehydrocyclization conditions employed it has been discovered that up to 5 wt% aromatic structures can be incorporated into the HVI-PAO molecular structure. Preferably, the dehydrocyclization reaction is performed on HVI-PAO oligomers produced from $C_8$-$C_{14}$ alpha-olefins, with 1-decene a most preferred alpha-olefin material to produce poly-1-decene oligomer.

C-13 NMR analysis of the products of the dehydrocyclization process of the present invention confirm that the products comprise liquid lubricant hydrocarbon having the recurring polymeric structure

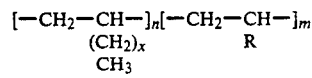

where x is 5 to 11, n is less than 500 and the ratio of n to m is between 200 and 20; wherein R contains x+1 carbon atoms comprising aryl, aralkyl or alkylaryl. For the particular case of the dehydrocyclization of poly-1-decene produced by the HVI-PAO process C-13 NMR analysis supports the conclusion of the aforestated structure where x is equal to 7. The poly-1-decene dehydrocyclization product has a viscosity of at least 2cS at 100° C. and a viscosity index of at least 130.

The catalysts used to affect the dehydrocyclization reaction of poly-alpha-olefin oligomers in the present invention includes those typically and conventionally employed to affect dehydrocyclization of alkanes, well known to those skilled in the organic chemical arts. These include Group VIII metals of the CAS version of the Periodic Table of the Elements, in particular platinum and palladium. Such catalysts are included on a solid support structure which may be taken from materials such as alumina, silica, clays, charcoal and zeolites. In the present invention zeolites and, more particularly, large pore zeolites have been found useful. Such zeolites include Beta, ZSM-12, Y, which possess a Constraint Index no greater than about 2 with alpha values ranging between 1 and 100.

A convenient measure of the extent to which a zeolite provides controlled access to molecules of varying sizes to its internal structure is the aforementioned Constraint Index of the zeolite. The method by which Constraint Index is determined is described fully in U.S. Pat. No. 4,016,218, to which reference is made for details of the method.

The zeolite(s) selected for use herein will generally possess an alpha value of at least about 1, preferably at least 10 and more preferably at least about 50. "Alpha value", or "alpha number", is a measure of zeolite acidic functionality and is more fully described together with details of its measurement in U.S. Pat. No. 4,016,218, *J. Catalysis*, 6, pp. 278-287 (1966) and *J. Catalysis*, 61, pp.

390-396 (1980). Zeolites of low acidity (alpha values of less than about 200) can be achieved by a variety of techniques including (a) synthesizing a zeolite with a high silica/alumina ration, (b) steaming, (c) steaming followed by dealuminization and (d) substituting framework aluminum with other species. For example, in the case of steaming, the zeolite(s) can be exposed to steam at elevated temperatures ranging from about 500° F. to about 1200° F. and preferably from about 750° to about 1000° F. This treatment can be accomplished in an atmosphere of 100% steam or an atmosphere consisting of steam and a gas which is substantially inert to the zeolite. A similar treatment can be accomplished at lower temperatures employing elevated pressure, e.g., at from about 350° to about 700° F. with from about 10 to about 200 atmospheres. Specific details of several steaming procedures may be gained from the disclosures of U.S. Pat. Nos. 4,325,994; 4,374,296; and 4,418,235, the contents of which are incorporated by reference herein.

It has been discovered that a particularly useful catalyst for the process comprises zeolite Beta bound with approximately 35 wt % alumina and containing about 0.6% platinum. This catalyst was steamed to yield an effective catalyst for dehydrocyclization having an alpha value of about 50.

The process of the present invention can be run under aromatization conditions which include hydrogen feed or flow to the reactor. Hydrogen can be co-fed at a rate between 0 and 5000 SCF/BBL. However, as illustrated in FIG. 1, the hydrogen flow rate effects the degree of aromatization achieved. The highest aromatic content is to be found when hydrogen flow rate is zero as shown in FIG. 1. Hydrogen flow rate also effects the degree of residual unsaturation remaining in the product following dehydrocyclization. The starting material HVI-PAO typically contains at least one olefinic group per oligomer molecule. The degree to which this unsaturation is eliminated in the final product is influenced by hydrogen flow rate as shown in FIG. 2. At high hydrogen flow rates bromine numbers less than 1 are achieved whereas at no hydrogen flow the bromine number for the poly-1-decene HVI-PAO aromatization product is greater than 6.

It has been determined that the process of this invention can be conducted at temperatures between 50 and 700° C., pressures between 20 and 1000 psig and liquid hourly space velocity (LHSV) between about 0.1 and 10. Preferably, the dehydrocyclization conditions comprise a temperature between about 100° and 300° C., a pressure between about 300 and 600 psig, and LHSV between about 0.4 and 1.

The following Examples illustrate the dehydrocyclization process of the present invention and the properties of the products produced therefrom. The Examples are presented strictly for illustration purposes and are not intended to limit the scope of the invention.

The feedstock used in Examples 3-6 is HVI-PAO liquid lubricant and prepared in a fixed bed reactor according to the procedures previously described. The oligomerization conditions and properties of the 1-decene HVI-PAO oligomer starting material produced in a fixed bed reactor are as follows: reaction temperature 165° C., pressure 40 psig, WHSV 2.5, lube yield 63.6%, viscosity at 40° C. 130.4 cS, viscosity at 100° C. 19.7 cS, viscosity index 173.1.

In Examples 3-6 the dehydrocyclization process carried out on the feedstock was conducted in a fixed bed reactor containing an aromatization catalyst comprising zeolite Beta containing 35 wt % alumina and 0.6 wt % platinum. The catalyst is steamed to an alpha value of 50. All of the experiments are conducted at 0.5 LHSV and a unit pressure of 400 psig. The hydrogen flow rate to the reactor is varied between 0 and 5000 SCF/BBL. Specific experimental conditions and properties of the product produced are described in Table 1.

TABLE 1

| Example | Feed | 3 | 4 | 5 | 6 |
| --- | --- | --- | --- | --- | --- |
| Reactor Temp., F. | | 256 | 264 | 264 | 295 |
| LHSV | | 0.48 | 0.51 | 0.50 | 0.50 |
| Pressure, psig | | 400 | 400 | 400 | 400 |
| H2 Flow, cc/min | | 21 | 0 | 80 | 75 |
| Yield wt % | | 83.3 | 92.5 | 40.0 | 46.7 |
| Bromine No. | 10.5 | 3.9 | 6.6 | 0.5 | 1.0 |
| Color | Clear | Brown | Brown | Yellow | Yellow |
| KV, 40° C. | 130.4 | 186.1 | 191.4 | 151.1 | 277.2 |
| KV, 100° C. | 19.7 | 26.1 | 25.8 | 22.9 | 34.2 |
| Visc. Index | 173.1 | 175.2 | 168.7 | 181.1 | 169.5 |
| Wt % Aromatic | 0.0 | 2.2 | 3.2 | 1.3 | 0.5 |

From the above data it is evident that a significant degree of aromaticity can be incorporated in HVI-PAO by the described process. As shown in Table 1, and as previously noted, aromatic structure formation varies as a function of hydrogen flow rate with the highest aromatic content achieved under conditions of no hydrogen flow. Remarkably, the viscosity indices of the aromatized HVI-PAO remains high with little or no decrease compared to the viscosity index of the starting material. Also, under conditions of high hydrogen flow rate to the dehydrocyclization zone or reactor there is an appreciable reduction in bromine number signifying concurrent hydrotreatment as well as aromatization of the HVI-PAO oligomer. Accordingly, those products with lowered bromine numbers can avoid subsequent hydrotreatment typically employed to stabilize the lubricant product.

These Examples serve to illustrate that between 0.4 and 5 wt. % of aromatic structure, based on total product weight, can be incorporated into HVI-PAO to provide new compositions as determined by C-13 NMR. These are new liquid lubricant compositions comprise $C_{24}-C_{5000}$ hydrocarbons, said composition having a branch ratio of less than 0.19, weight average molecular weight between 420 and 60,000, number average molecular weight between 420 and 24,000, molecular weight distribution between 1 and 5, pour point below −15° C. and containing between about 0.4 and 4 weight percent of aromatic structure.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for producing a polyalpha-olefin containing aromatic structures by the dehydrocyclization of polyalpha-olefin comprising:
    contacting a polyalpha-olefin produced by the oligomerization of a $C_6-C_{20}$ olefin with dehydrocyclization catalyst in a dehydrocyclization zone under dehydrocyclization conditions whereby modified polyalpha-olefin is produced which contains aromatic structure attached as pendant groups to the backbone of the polyalpha-olefin structure.

2. The process of claim 1 wherein said polyalpha-olefin comprises the product of the oligomerization of alpha olefins containing 6 to 20 carbon atoms, or mixtures of such olefins; said oligomerization comprising: contacting said olefins under oligomerization conditions, at reaction temperature of about 90° to 250° C. with a chromium catalyst on a porous support, which catalyst has been treated by oxidation at a temperature of 200° C. to 900° C. in the presence of an oxidizing gas and then by treatment with a reducing agent at a temperature and for a time sufficient to reduce said catalyst to a lower valence state; to obtain an oligomeric liquid lubricant composition comprising $C_{30}$–$C_{1300}$ hydrocarbons, said composition having a branch ratio of less than 0.19, weight average molecular weight between 420 and 45,000, number average molecular weight between 420 and 18,000, molecular weight distribution between 1 and 5 and pour point below 15° C.

3. The process of claim 2 wherein the liquid lubricant composition has a viscosity index greater than 130.

4. The process of claim 2 wherein said reducing agent comprises CO and the oligomerization temperature is about 100°-180° C.

5. The process of claim 2 wherein the support comprises porous silica.

6. The process of claim 2 wherein the olefin consists essentially of 1-octene, 1-decene, 1-dodecene, 1-tetradecene or mixtures thereof.

7. The process of claim 6 wherein the olefin consists essentially of 1-decene.

8. The process of claim 1 wherein said dehydrocyclization catalyst is taken from the group consisting essentially of supported Group VIII metals of the Periodic Table and zeolites ZSM-5, ZSM-12, Y, Beta containing said metals, wherein said support is taken from the group consisting essentially of alumina, silica, clays and charcoal.

9. The process of claim 1 wherein said dehydrocyclization catalyst comprises zeolite Beta on alumina support containing platinum, said catalyst having an alpha value of about 50.

10. The process of claim 1 wherein said dehydrocyclization conditions comprise temperature between about 50 and 700° C., pressure between about 20 and 1000psig, LHSV between about 0.1 and 10.

11. The process of claim 1 wherein said dehydrocyclization conditions comprise temperature between about 100 and 300° C., pressure between about 300 and 600psig, LHSV between about 0.4 and 1.

12. The process of claim 1 further comprising cofeeding hydrogen with said polyalpha-olefin to said dehydrocyclization zone.

13. The process of claim 12 wherein said hydrogen is cofed at a rate between 0 and 5000 SCF/BBl.

14. The process of claim 1 wherein said modified polyalpha-olefin comprises liquid hydrocarbon lubricant having viscosity at 100° C. greater than 2cS and VI greater than 130.

15. The process of claim 1 wherein said modified polyalpha-olefin aromatic structure comprises between about 0.4 and 4 weight percent.

16. A process for introducing aromaticity into the structure of high VI liquid lubricant hydrocarbon, comprising;
contacting the product of the oligomerization of $C_6$ to $C_{20}$ alpha-olefin feedstock, or mixtures thereof, under oligomerization conditions in contact with a reduced valence state Group VIB metal catalyst on porous support, said product comprising lubricant having a branch ratio less than 0.19, viscosity index greater than 130 and a pour point less than $-15°$ C., with aromatization catalyst comprising Group VIII metal on solid support in an aromatization zone under aromatization conditions, whereby liquid lubricant is produced containing aromatic structure.

17. The process of claim 16 wherein the liquid lubricant product has a viscosity index greater than 130 and viscosity greater than 2cS at 100° C.

18. The process of claim 16 wherein said aromatization catalyst is taken from the group consisting essentially of the supported metals platinum and palladium and zeolites ZSM-5, ZSM-12, Y, Beta containing said metals, wherein said support is taken from the group consisting essentially of alumina, silica, clays and charcoal.

19. The process of claim 16 wherein said aromatization catalyst comprises zeolite Beta on alumina support containing platinum, said catalyst having an alpha value of about 50.

20. The process of claim 16 wherein said aromatization conditions comprise temperature between about 50° and 700° C., pressure between about 20 and 1000psig, LHSV between about 0.1 and 10.

21. The process of claim 16 wherein said aromatization conditions comprise temperature between about 100° and 300° C., pressure between about 300 and 600psig, LHSV between about 0.4 and 1.

22. The process of claim 16 further comprising co-feeding hydrogen with said polyalpha-olefin to said dehydrocyclization zone.

23. The process of claim 22 wherein said hydrogen is cofed at a rate between 0 and 5000 SCF/BBl.

24. The process of claim 16 wherein said liquid lubricant product aromatic structure comprises between about 0.4 and 4 weight percent of said product.

* * * * *